United States Patent
Chung et al.

(10) Patent No.: US 9,643,874 B2
(45) Date of Patent: May 9, 2017

(54) METHODS AND APPARATUSES FOR REDUCING HEAT LOSS FROM EDGE DIRECTORS

(71) Applicant: Corning Incorporated, Corning, NY (US)

(72) Inventors: Ren Hua Chung, Tainan (TW); Ahdi El-Kahlout, Lexington, KY (US); David Scott Franzen, Painted Post, NY (US); Brendan William Glover, Corning, NY (US); Paul Richard Grzesik, Canandaigua, NY (US); Bulent Kocatulum, Horseheads, NY (US); Gaozhu Peng, Horseheads, NY (US); Michael John Stephenson, Bath, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/203,044

(22) Filed: Jul. 6, 2016

(65) Prior Publication Data
US 2016/0311716 A1 Oct. 27, 2016

Related U.S. Application Data

(62) Division of application No. 14/278,582, filed on May 15, 2014, now Pat. No. 9,512,025.

(51) Int. Cl.
*C03B 17/06* (2006.01)

(52) U.S. Cl.
CPC .......... *C03B 17/064* (2013.01); *C03B 17/067* (2013.01); *C03B 17/068* (2013.01)

(58) Field of Classification Search
CPC .... C03B 17/064; C03B 17/067; C03B 17/068
USPC .................................. 65/53, 195, 199, 171
See application file for complete search history.

(56) References Cited

U.S. PATENT DOCUMENTS

| | | |
|---|---|---|
| 3,451,798 A | 6/1969 | Simon |
| 3,506,429 A | 4/1970 | Overman |
| 3,537,834 A | 11/1970 | Simon |
| 7,409,839 B2 | 8/2008 | Boratav et al. |
| 8,141,388 B2 | 3/2012 | Burdette |
| 8,176,753 B2 | 5/2012 | Kahlout et al. |
| 8,474,286 B2 | 7/2013 | Pitbladdo |
| 2003/0121287 A1 | 7/2003 | Chalk et al. |
| 2008/0282736 A1 | 11/2008 | Filippov et al. |
| 2011/0100057 A1 | 5/2011 | Gaylo |
| 2011/0209502 A1 | 9/2011 | El Kahlout et al. |
| 2012/0111060 A1 | 5/2012 | Tsuda et al. |
| 2013/0133370 A1 | 5/2013 | Boratav et al. |
| 2013/0319049 A1 | 12/2013 | Grzesik et al. |

*Primary Examiner* — Alison L Hindenlang
*Assistant Examiner* — Mohamed K Ahmed Ali
(74) *Attorney, Agent, or Firm* — Kevin M. Able; Brian Tent

(57) ABSTRACT

An apparatus and methods for making a glass ribbon includes a forming wedge with a pair of inclined forming surface portions converging along a downstream direction to form a root. The apparatus further includes an edge director intersecting with at least one of the pair of downwardly inclined forming surface portions, and a replaceable heating cartridge configured to direct heat to the edge director and thermally shield the edge director from heat loss. A replaceable heating cartridge is also provided for directing heat to the edge director and thermally shielding the edge director from heat loss.

8 Claims, 7 Drawing Sheets

METHODS AND APPARATUSES FOR REDUCING HEAT LOSS FROM EDGE DIRECTORS

This is a divisional of U.S. patent application Ser. No. 14/278,582 filed on May 15, 2014, the content of which is incorporated herein by reference in its entirety.

BACKGROUND

Field

The present specification generally relates to apparatuses and methods for making glass ribbons, and more specifically, to apparatuses and methods for making glass ribbons with edge directors and replaceable heating cartridges that direct heat to the edge directors and thermally shield the edge directors from a plurality of edge rollers.

Technical Background

Glass forming apparatuses are commonly used to form various glass products such as glass sheets used for LCD displays and the like. These glass sheets may be manufactured by downwardly flowing molten glass over a forming wedge to form a continuous glass ribbon. Edge directors are frequently provided at opposed ends of the forming wedge to help achieve a desired glass ribbon width and edge characteristics. However, these edge directors may also act as heat sinks leading to the devitrification of molten glass in proximity to the edge directors. Such devitrification may cause defects in the glass ribbon which, in turn, may lead to manufacturing losses and increased production costs.

Accordingly, a need exists for alternative methods and systems for forming glass ribbons which mitigate devitrification of the glass proximate to the edge directors.

SUMMARY

According to one embodiment, an apparatus for making a glass ribbon with reduced devitrification is provided. The apparatus may include a forming wedge with a pair of inclined forming surface portions converging along a downstream direction to form a root. The apparatus further includes an edge director intersecting with at least one of the pair of downwardly inclined forming surface portions, and a plurality of edge rollers positioned downstream from the root and edge director. The plurality of edge rollers may be positioned to engage an edge portion of the glass ribbon. A housing may enclose the forming wedge, edge director, and the plurality of rollers. The apparatus may further include a removable heating cartridge that is positioned in a port of the housing below the edge director. The heating cartridge may include an enclosure having a heat directing surface that is inclined at an angle of less than about 90° with respect to a bottom surface of the enclosure. The heat directing surface may include at least one heating element positioned on or adjacent to a face thereof. The heating cartridge may be oriented such that the heat directing surface faces the edge director, a view factor from the heat directing surface is greater at the edge director than at the edge rollers, and the lower edge of the heat directing surface and the bottom surface of the heating cartridge are at least partially positioned between the edge director and the plurality of edge rollers to thermally shield the edge director from the plurality of edge rollers.

In another embodiment, a replaceable heating cartridge for use in an apparatus for making a glass ribbon with reduced devitrification is provided. The replaceable heating cartridge may include an enclosure having a heat directing surface that is inclined at an angle of less than about 90° with respect to a bottom surface of the enclosure. The heat directing surface may include at least one heating element positioned on or adjacent to a face thereof. The cartridge may further include refractory material disposed within the enclosure behind the heat directing surface. A view factor from the heat directing surface may be greater above the bottom surface of the enclosure than below the bottom surface of the enclosure, and the lower edge of the heat directing surface and the bottom surface of the heating cartridge may thermally shield the area above the heat directing surface from the area below the heat directing surface.

In yet another embodiment, a fusion draw method of making a glass ribbon with reduced devitrification may include flowing molten glass over a pair of downwardly inclined forming surface portions of a forming wedge, the downwardly inclined forming surface portions converging along a downstream direction to form a root. The method may further include flowing the molten glass over an edge director intersecting with at least one of the pair of downwardly inclined forming surface portions, drawing the molten glass from the root of the forming wedge to form the glass ribbon, and engaging an edge portion of the glass ribbon with a plurality of edge rollers positioned downstream from the root and edge director. The method may further include heating the edge director with a replaceable heating cartridge located in a port in the housing. The replaceable heating cartridge may be positioned between the plurality of edge rollers and the edge director. The replaceable heating cartridge may include an enclosure having a heat directing surface that is inclined at an angle of less than about 90° with respect to a bottom surface of the enclosure. The heat directing surface may include at least one heating element positioned on or adjacent to a face thereof. The replaceable heating cartridge may be oriented such that the heat directing surface faces the edge director, a view factor from the heat directing surface is greater at the edge director than at the edge rollers, and the lower edge of the heat directing surface and the bottom surface of the replaceable heating cartridge are at least partially disposed between the edge director and the plurality of edge rollers to thermally shield the edge director from the plurality of edge rollers.

Additional features and advantages of the apparatus and methods for making a glass ribbon and replaceable heating cartridge for use in such apparatus and methods will be set forth in the detailed description which follows, and in part will be readily apparent to those skilled in the art from that description or recognized by practicing the embodiments described herein, including the detailed description which follows the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, ad together with the description serve to explain the principles and operations of the claimed subject matter.

DETAILED DESCRIPTION

Figure 1:
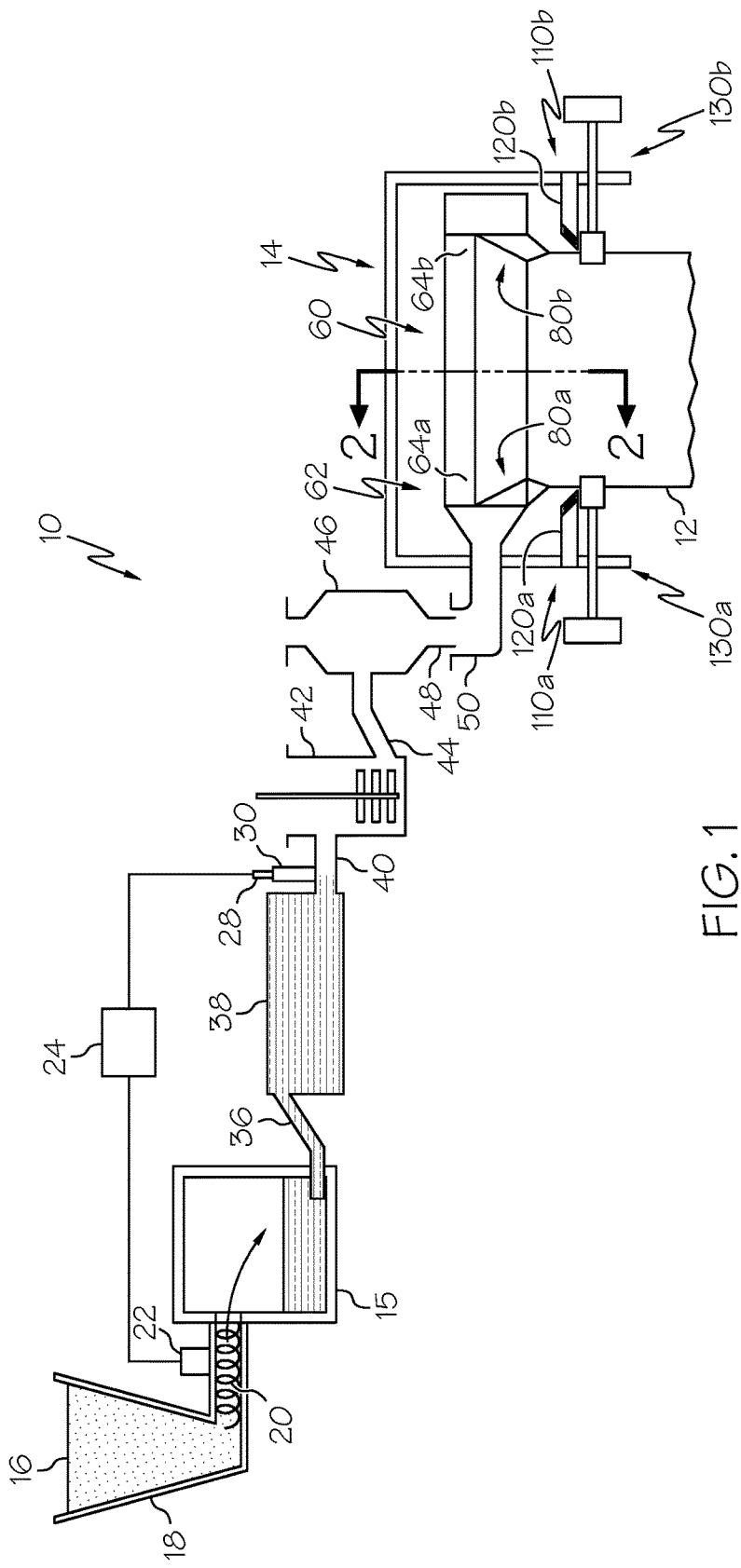
FIG. 1 schematically depicts an apparatus for making glass according to one or more embodiments shown and described herein.

Reference will now be made in detail to embodiments of the apparatuses and methods for making glass ribbon and replaceable heating cartridges for use in such apparatuses and methods, examples of which are illustrated in the accompanying drawings. Whenever possible, the same reference numerals are used throughout the drawings to refer to the same or like parts. One embodiment of an apparatus for making glass is shown in FIG. 1, and is designated generally throughout by the reference number 10. The apparatus generally includes a heating cartridge that is removably positioned in a port of a housing surrounding a forming vessel below an edge director affixed to the forming vessel. The heating cartridge may comprise an enclosure having a heat directing surface that is inclined at an angle of less than about 90° with respect to a bottom surface of the enclosure. The heat directing surface includes at least one heating element positioned on or adjacent to a face thereof. The heating cartridge is oriented such that the heat directing surface faces the edge director and a view factor from the heat directing surface is greater at the edge director than at edge rollers located below the edge director. The lower edge of the heat directing surface and the bottom surface of the heating cartridge are at least partially positioned between the edge director and the edge rollers to thermally shield the edge director from the plurality of edge rollers. Apparatuses for making glass and replaceable heating cartridges for use in such apparatuses will be described in further detail herein with specific reference to the appended drawings.

Referring now to FIG. 1, one embodiment of a glass forming apparatus 10 for making glass, such as a glass ribbon 12, is schematically depicted. The glass forming apparatus 10 generally includes a melting vessel 15 configured to receive batch material 16 from a storage bin 18. The batch material 16 can be introduced to the melting vessel 15 by a batch delivery device 20 powered by a motor 22. An optional controller 24 may be provided to activate the motor 22 and a molten glass level probe 28 can be used to measure the glass melt level within a standpipe 30 and communicate the measured information to the controller 24.

The glass forming apparatus 10 can also include a fining vessel 38, such as a fining tube, located downstream from the melting vessel 15 and coupled to the melting vessel 15 by way of a first connecting tube 36. A mixing vessel 42, such as a stir chamber, can also be located downstream from the fining vessel 38. A delivery vessel 46, such as a bowl, may be located downstream from the mixing vessel 42. As depicted, a second connecting tube 40 couples the fining vessel 38 to the mixing vessel 42 and a third connecting tube 44 couples the mixing vessel 42 to the delivery vessel 46. As further illustrated, a downcomer 48 is positioned to deliver glass melt from the delivery vessel 46 to an inlet 50 of a forming vessel 60. In the embodiment schematically depicted in FIG. 1, the melting vessel 15, fining vessel 38, mixing vessel 42, delivery vessel 46, and forming vessel 60 are examples of various glass melt stations that may be located in series along the glass forming apparatus 10.

The melting vessel 15 is typically made from a refractory material, such as refractory (e.g., ceramic) brick. The glass forming apparatus 10 may further include components that are typically made from platinum or platinum-containing metals such as platinum-rhodium, platinum-iridium and combinations thereof, but which may also comprise such refractory metals such as molybdenum, palladium, rhenium, tantalum, titanium, tungsten, ruthenium, osmium, zirconium, and alloys thereof and/or zirconium dioxide. The platinum-containing components can include one or more of the first connecting tube 36, the fining vessel 38, the second connecting tube 40, the standpipe 30, the mixing vessel 42, the third connecting tube 44, the delivery vessel 46, the downcomer 48 and the inlet 50. The forming vessel 60 can also be made from a refractory material and is designed to form the glass melt into a glass ribbon 12.

Figure 2:
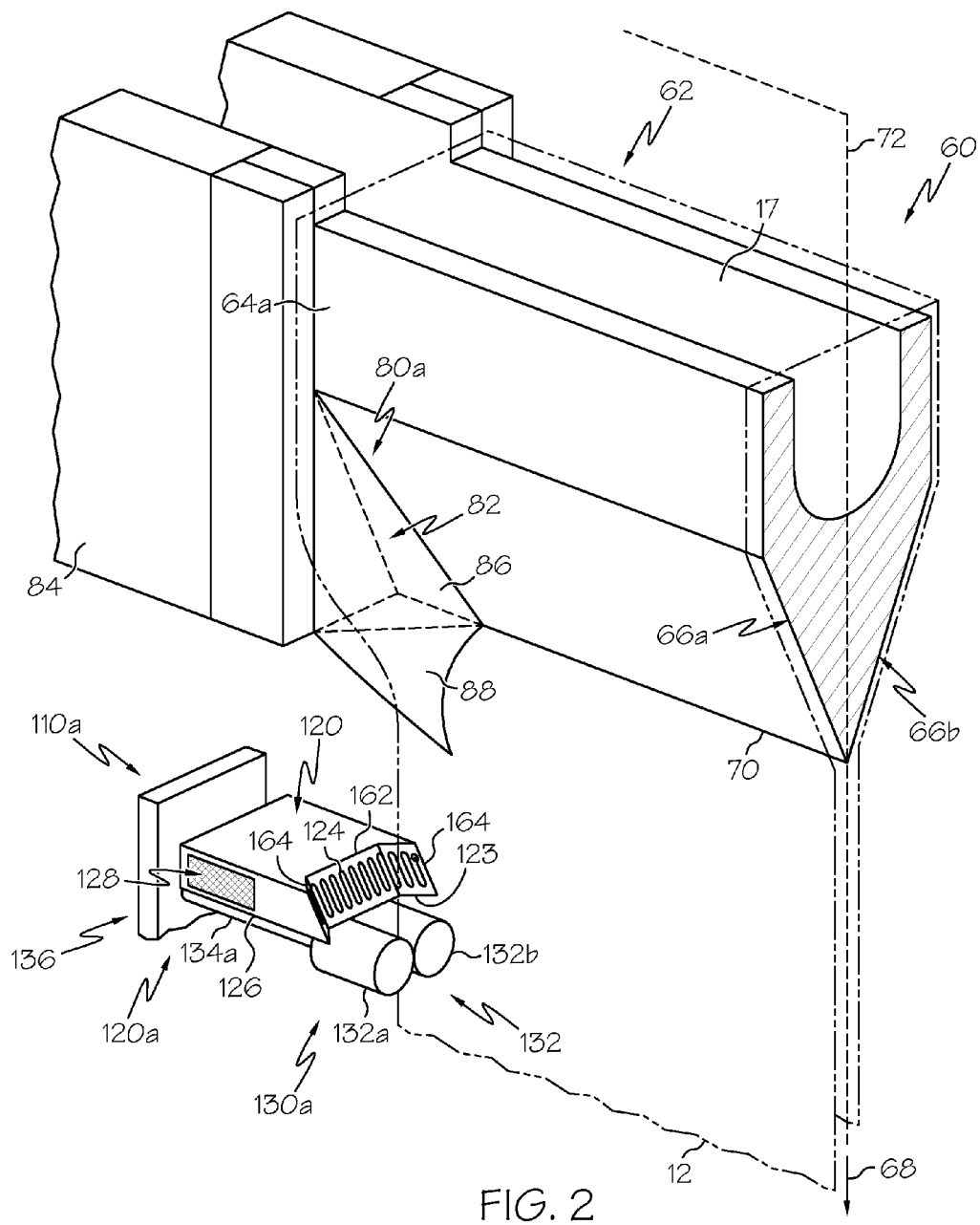
FIG. 2 schematically depicts an apparatus for making glass according to one or more embodiments shown and described herein which comprises a cross sectional perspective view of the embodiment along line 2-2 of FIG. 1.

FIG. 2 is a cross sectional perspective view of the glass forming apparatus 10 along line 2-2 of FIG. 1. As shown, the forming vessel 60 includes a forming wedge 62 comprising a pair of downwardly inclined forming surface portions 66a, 66b that extend between opposed ends 64a, 64b of the forming wedge 62. The downwardly inclined forming surface portions 66a, 66b converge along a downstream direction 68 to form a root 70. A draw plane 72 extends through the root 70. The glass ribbon 12 may be drawn in the downstream direction 68 along the draw plane 72. The draw plane 72 bisects the root 70 in a generally horizontal, lengthwise direction of the forming vessel. However, it should be understood that the draw plane 72 may extend at other orientations with respect to the root 70. While FIGS. 1 and 2 generally depict one embodiment of a glass forming apparatus and a forming vessel, it should also be understood that aspects of the present disclosure may be used with various other forming vessel configurations.

Referring to FIGS. 1 and 2, in certain embodiments, the forming vessel 60 may comprise an edge director 80a, 80b intersecting with the pair of downwardly inclined forming surface portions 66a, 66b. The edge directors help achieve a desired glass ribbon width and edge bead characteristics by directing the molten glass proximate to the root 70 of the forming vessel 60. In further embodiments, the edge director can intersect with both downwardly inclined forming surface portions 66a, 66b. In addition or alternatively, in certain embodiments an edge director can be positioned at each of the opposed ends 64a, 64b of the forming wedge 62. For instance, as shown in FIG. 1, an edge director 80a, 80b can be positioned at each of the opposed ends 64a, 64b of the forming wedge 62 with each edge director 80a, 80b configured to intersect with both of the downwardly inclined forming surface portions 66a, 66b. As further illustrated, each edge director 80a, 80b is substantially identical to one another. However, it should be understood that, in alternative embodiments, the edge directors may have different configurations and/or geometries depending on the specific characteristics of the glass forming apparatus. Further, it should be understood that various forming wedge and edge director configurations may be used in accordance with aspects of the present disclosure. For example, aspects of the present disclosure may be used with forming wedges and edge director configurations as disclosed in U.S. Pat. Nos. 3,451,798, 3,537,834, 7,409,839 and/or U.S. Provisional Pat. Application No. 61/155,669, filed Feb. 26, 2009, each of which are herein incorporated by reference.

Figure 3:
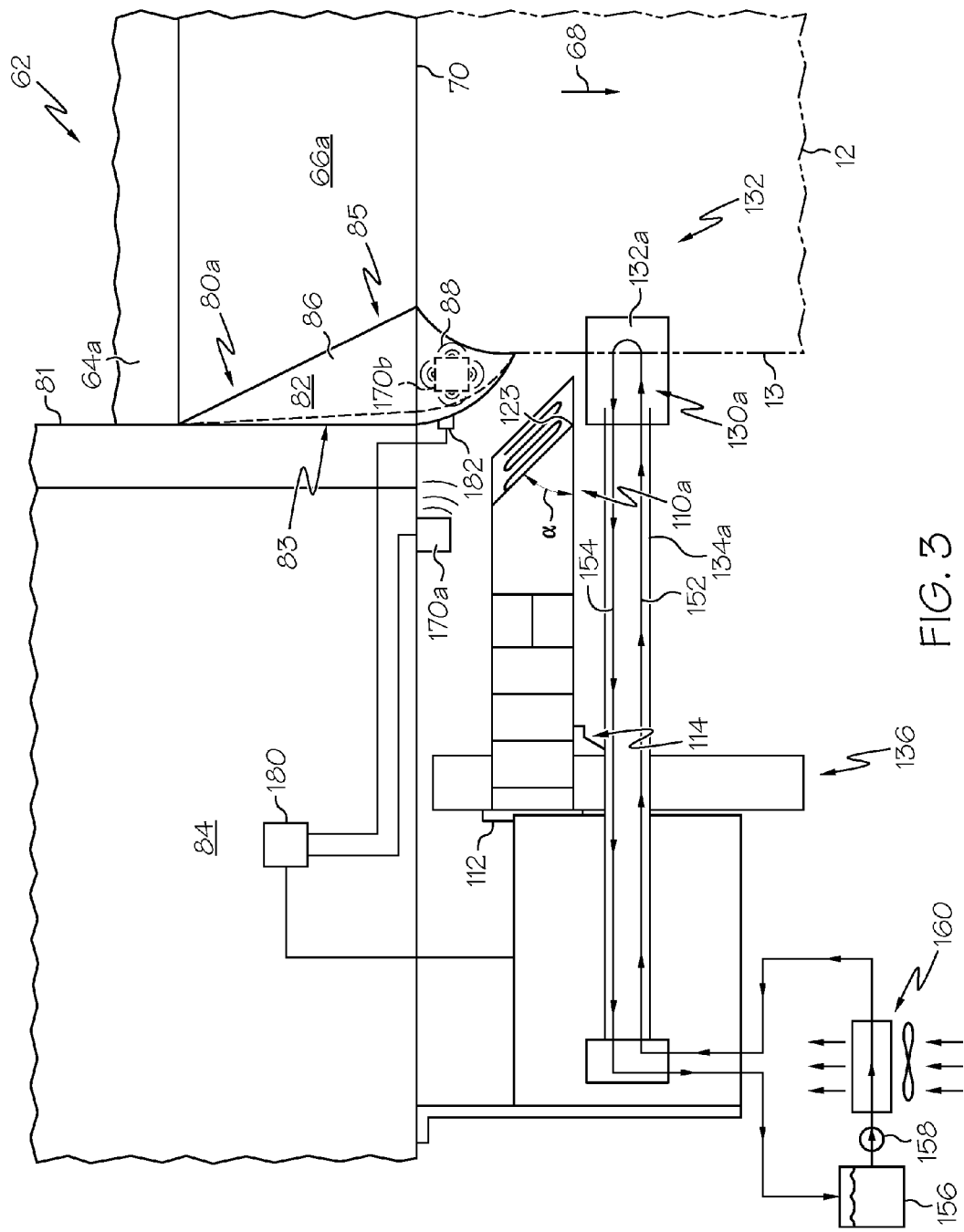
FIG. 3 schematically depicts a side view of the apparatus for making glass of FIG. 2 according to one or more embodiments shown and described herein.

Referring now to FIGS. 2 and 3, an embodiment of an edge director that may be used with aspects of the present disclosure is schematically depicted. The first edge director 80a will be described in more detail. However, it should be understood that the second edge director 80b, may be identical to or of a similar construct as the first edge director 80a. Use of identical edge directors can be beneficial for providing a uniform glass ribbon. However, it should be understood that the individual edge directors may also have different configurations and/or geometries to accommodate various glass forming apparatus and/or forming vessel configurations.

FIGS. 2 and 3 illustrate a first side of one embodiment of a first edge director 80a positioned with respect to the first downwardly inclined forming surface portion 66a of the forming wedge 62. Although not depicted, the first edge director 80a further includes a second side positioned with respect to the second downwardly inclined forming surface portion 66b of the forming wedge 62. The second side of the first edge director 80a is a mirror image of the first side about the draw plane 72 bisecting the root 70. As depicted, the first side of the first edge director 80a includes a first surface 82 that intersects the first downwardly inclined forming surface portion 66a of the forming wedge 62.

In some embodiments, each opposed end 64a, 64b of the forming wedge 62 is provided with a retaining block 84 designed to laterally position the corresponding first and second edge directors 80a, 80b. Optionally, as depicted, the first edge director 80a can include an upper portion 86 and a lower portion 88. The lower portion 88 can, in some embodiments, join the first edge director 80a on the first opposed end 64a with the second edge director 80b on the second opposed end 64b. Joining the edge directors 80a, 80b together is beneficial to simplify assembly of the edge directors 80a, 80b to the forming wedge 62. In further embodiments, the upper portions 86 of the edge directors 80a, 80b may be provided separately. For example, as depicted, the first edge director 80a is separate from the second edge director 80b and the separate edge directors are assembled independently to each of the pair of downwardly inclined forming surface portions 66a, 66b of the forming wedge 62. With certain embodiments, providing upper portions 86 that are not joined may simplify manufacture of the edge directors 80a, 80b.

The glass forming apparatus 10 also includes at least one edge roller assembly for drawing glass ribbon from the root 70 of the forming vessel 60. For example, the apparatus may include a pair of edge roller assemblies 130a, 130b, as depicted in FIG. 1. Referring to FIGS. 1 and 2, the edge roller assemblies 130a, 130b (edge roller assembly 130a depicted in FIG. 2) generally include a first pair of edge rollers 132 configured to engage a corresponding edge of the glass ribbon as the ribbon is drawn from the root 70 of the forming wedge 62. The edge roller assemblies 130a, 130b aid in drawing the glass ribbon 12 from the root 70 of the forming wedge 62 and also facilitate proper finishing of the edges of the glass ribbon. For example, the edge roller assemblies 130a, 130b may provide the desired edge characteristics and proper fusion of the edge portions of the molten glass being drawn off opposed surfaces of the edge director 80a, 80b associated with the pair of downwardly inclined forming surface portions 66a, 66b. In certain embodiments, the edge roller assembly 130a, 130b can be located at various positions within the viscous region of the glass being drawn from the root 70. For instance, in some embodiments the edge roller assemblies 130a, 130b can be located anywhere from immediately below the root 70 to a position about 38.1 centimeters below the root 70. However, it should be understood that other positions are contemplated. For example, the edge roller assemblies 130a, 130b can be located at a position within a range of from about 20 centimeters to about 25.5 centimeters below the root 70.

As depicted in FIG. 1, in one embodiment, a first edge roller assembly 130a is associated with the first edge director 80a and a second edge roller assembly 130b is associated with the second edge director 80b. In the embodiments described herein, each edge roller assembly 130a, 130b is substantially identical to the other.

FIGS. 2 and 3 depict one embodiment of an edge roller assembly 130a. As depicted in FIG. 2, the first edge roller assembly 130a includes a first pair of edge rollers 132 including a first edge roller 132a and a second edge roller 132b. The edge rollers 132a, 132b are configured to simultaneously engage the first side and the second side of a glass ribbon 12 drawn from the root 70 of the forming wedge 62. The first edge roller assembly 130a includes a first shaft 134a attached to the first edge roller 132a and a second shaft 134b attached to the second edge roller 132b. The first and second shafts 134a, 134b extend through a housing seal plate 136 and are rotatably driven by a motor 138. The housing seal plate 136 provides a closure to an opening (not shown) leading to an area in which the motor 138 is located. The housing seal plate 136 forms part of housing 14 (FIG. 1) which encloses the forming vessel 60, edge directors 80a, 80b and the edge roller assemblies 130a, 130b. The housing 14 may comprise a refractory material, steel, and/or other thermal insulation to protect sensitive components of the motor and/or other mechanisms located within the housing as well as to thermally insulate the forming vessel 60, and the molten glass flowing in and around the forming vessel 60, from the surrounding environment.

Referring now to FIG. 3, in certain embodiments the first and second rollers 132a, 132b may be actively cooled (e.g., with gas or liquid) to help reduce the likelihood of molten glass being deposited on the edge rollers 132a, 132b and adhering thereto. For example, as shown in FIG. 3, an inlet line 152 is configured to extend through each shaft 134a, 134b to provide a cooling liquid to the first and second rollers 132a, 132b. An outlet line 154 also extends through each shaft 134a, 134b to return heated liquid to a fluid source 156. A hydraulic pump 158 can draw liquid from the fluid source and pass the liquid through a heat exchanger 160 to remove heat transferred from the first and second rollers 132a, 132b before cycling the liquid back through the inlet line 152 to continue cooling the first and second rollers 132a, 132b.

For glass forming apparatuses as depicted in FIGS. 1-3, it has been found that thermal gradients within the housing 14, such as thermal gradients caused by the localized cooling of the edge roller assemblies 130a, 130b may cause devitrification of the molten glass flowing over the edge directors 80a, 80b. Specifically, the cooler edge rollers act as a heat sink, drawing heat from the edge directors 80a, 80b, thereby reducing the temperature of the edge directors 80a, 80b. As the molten glass drawn over the forming vessel 60 contacts the cooler edge directors 80a, 80b, the molten glass can devitrify, disrupting the flow of molten glass and potentially introducing defects in the glass ribbon drawn from the root 70 of the forming vessel 60.

Referring again to FIG. 1, to prevent the devitrification of the molten glass in contact with the edge directors 80a, 80b, the glass forming apparatus 10 further includes a replaceable heating cartridge 110a, 110b positioned in the housing 14. The replaceable heating cartridge may be configured to direct heat onto the edge directors 80a, 80b, thereby maintaining the edge directors 80a, 80b at a temperature above the divitrification temperature of the molten glass, thereby mitigating the devitrification of the glass. The replaceable heating cartridge 110a, 110b may also serve as a barrier to thermally isolate and shield the edge directors 80a, 80b from the cooler edge rollers 132a, 132b, thereby preventing heat transfer from the edge directors to the edge rollers 132a, 132b. For example, the glass forming apparatus 10 may include one or more replaceable heating cartridges 110a, 110b (one depicted) that are removably mounted in the housing 14 of the glass forming apparatus 10. The replaceable heating cartridges can be replaced or upgraded during a draw campaign rather than waiting until the end of the campaign, thereby reducing production losses and equipment downtime. FIGS. 1-5 schematically depict embodiments of replaceable heating cartridges 110a, 110b inserted in the housing 14 of the glass forming apparatus 10.

Figure 4A:
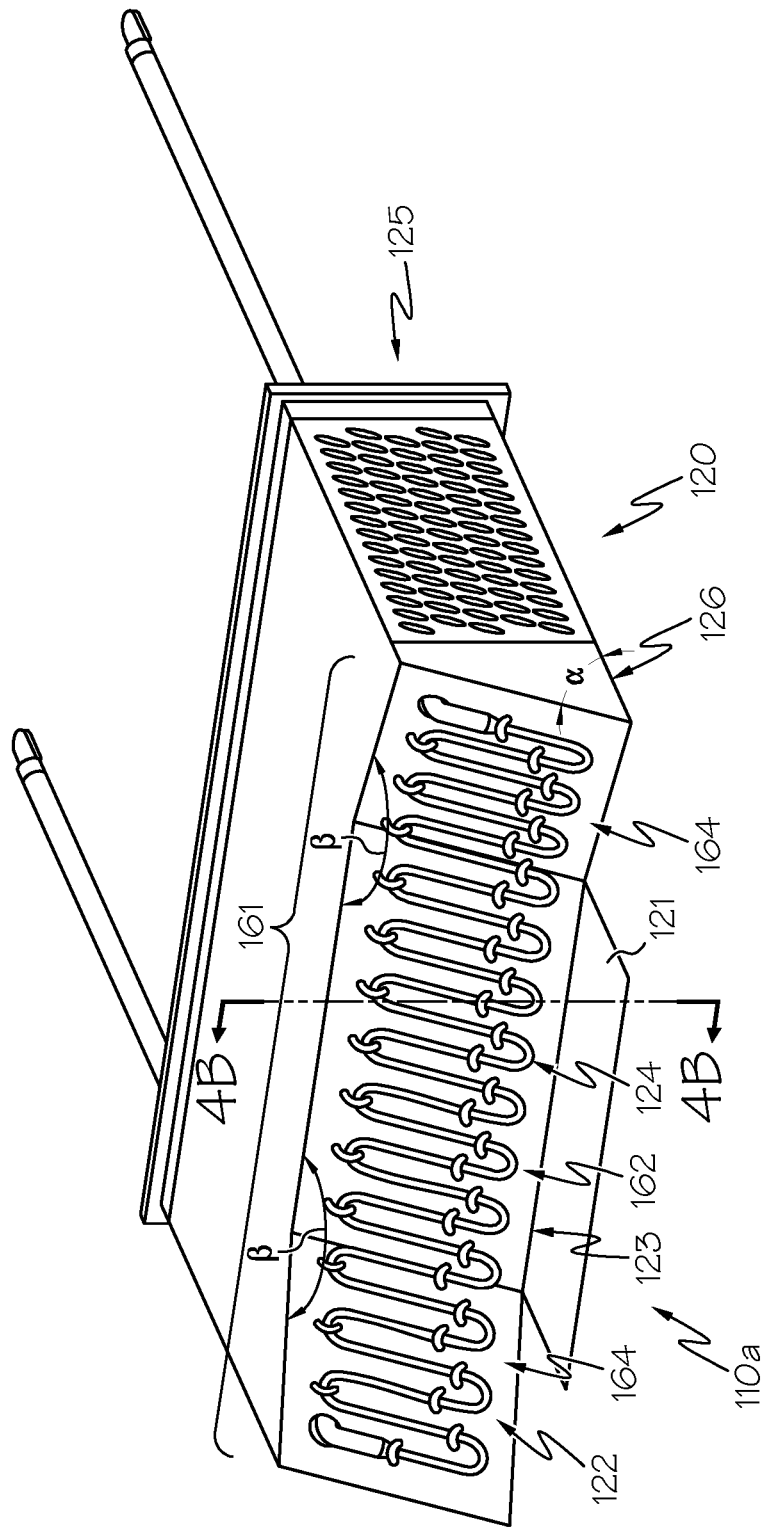
FIG. 4A schematically depicts a replaceable heating cartridge for use in an apparatus for making glass according to one or more embodiments shown and described herein and FIG. 4B schematically depicts a cross section of the replaceable heating cartridge along line 4-4 of FIG. 4A.
Figure 4B:
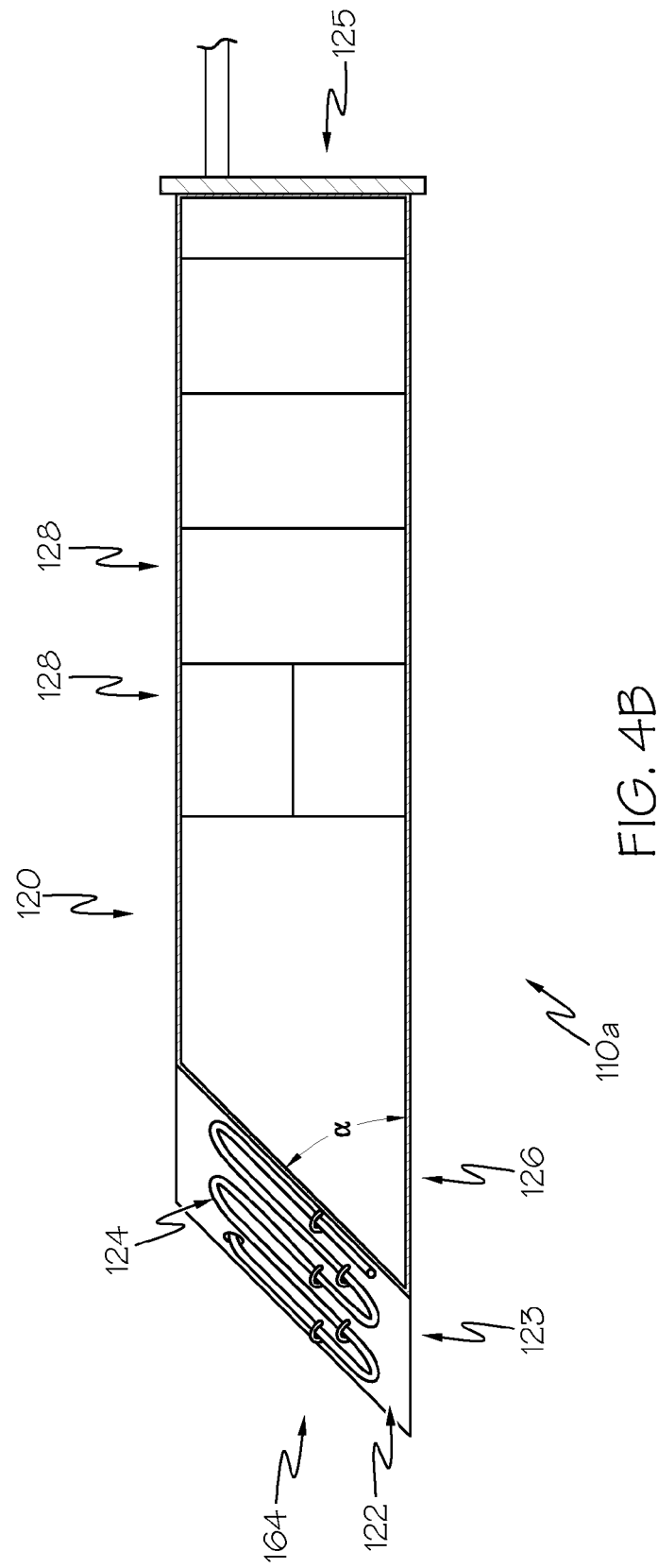
Figure 5:
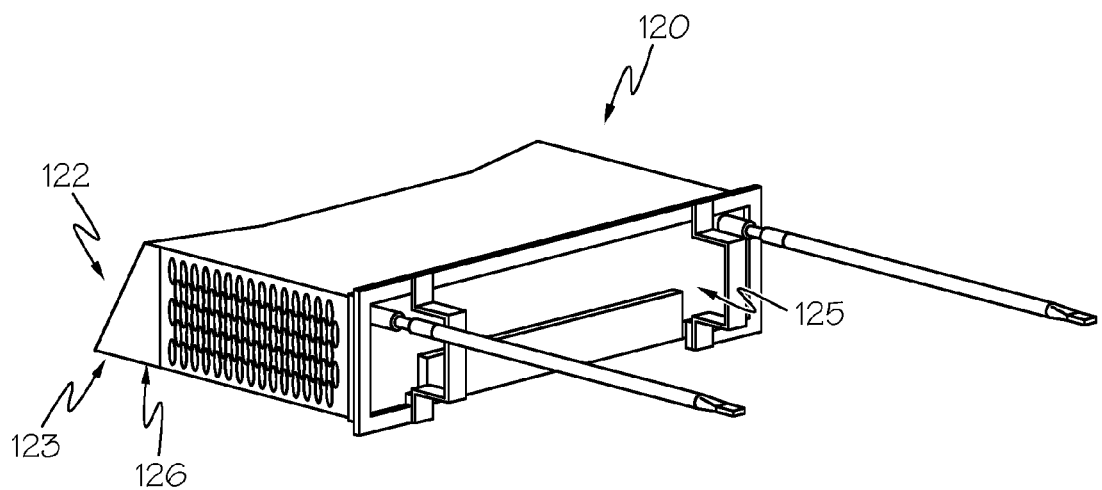
FIG. 5 schematically depicts a perspective back view of the replaceable heating cartridge for use in the apparatus for making glass of FIG. 4 according to one or more embodiments shown and described herein.

Referring now to FIGS. 3-5, in one embodiment, the first replaceable heating cartridge 110a includes an enclosure 120 having a heat directing surface 122 with at least one heating element 124 positioned on or adjacent to the face thereof. The enclosure 120 may be fabricated from a variety of materials that absorb or, reflect heat energy, or that provide a thermal shield while maintaining structural integrity under typical temperature conditions associated with the glass forming apparatus 10. For instance, the enclosure 120, and other portions of the replaceable heating cartridge 110a, can be formed from a refractory material, high temperature, nickel-based alloys, steel (e.g., stainless steel), or other alloys or other materials or combinations of materials, to meet the structural and/or thermal requirements of the glass forming apparatus 10. For example, in one embodiment, the enclosure 120 may be made of nickel-based alloys, such as Hanes 214. In one particular embodiment, the heat directing surface 122 of the first replaceable heating cartridge 110a is formed from a ceramic refractory backer material with low emissivity. Suitable ceramic refractory materials include, without limitation, SALI board available from Zircar ceramics. Portions of the enclosure which are not directly exposed to the high temperatures of the glass forming apparatus 10 may be made from materials suitable for lower temperature applications. For example, the back face 125 of the enclosure 120 may be made from stainless steel, such as, for example, 420 stainless steel.

According to certain embodiments, the heat directing surface 122 of the replaceable heating cartridge 110a is typically inclined at an angle $\alpha$ of less than about 90° with respect to a bottom surface 126 of the enclosure 120. In certain embodiments, the inclined angle $\alpha$ of the heat directing surface 122 is from about 45° to about 75° relative to the bottom surface 126 of the enclosure. In specific embodiments, the inclined angle $\alpha$ of the heat directing surface 122 is about 60° relative to the bottom surface 126. The inclined angle of the heat directing surface 122 facilitates positioning the first replaceable heating cartridge 110a in the housing 14 of the glass forming apparatus such that the heat directing surface 122 faces the first edge director 80a. The angle of the heat directing surface 122 and the orientation of the first replaceable heating cartridge 110a enables the heat directing surface 122 to radiate and direct heat toward and onto the first edge director 80a with only minimal loss of heat to the surrounding environment. In addition, the angle of the heat directing surface 122 and the position of the replaceable heating cartridge 110a is such that the view factor from the heat directing surface is greater at the first edge director 80a than at the first pair of edge rollers 132a. The term "view factor," as used herein, refers to the relative proportion of thermal radiation from the heat directing surface 122 which is incident on the specified surface (i.e., either the edge director 80a or the edge rollers 132a, 132b).

In some embodiments, the replaceable heating cartridge 110a may optionally include a shield member 121 extending from the center facet 162 of the heat directing surface 122 proximate the bottom surface 126 of the replaceable heating cartridge 110a, as schematically depicted in FIG. 4A. The shield member 121 may provide additional thermal shielding and reduce heat loss from the first edge director 80a to the environment below the replaceable heating cartridge 110a.

Still referring to FIGS. 3-5, the replaceable heating cartridge 110a also includes a heating element 124 positioned on or adjacent to the heat directing surface 122 of the enclosure 120. In certain embodiments, the heating element 124 positioned on or adjacent to the heat directing surface 122 is a resistance heating element. The material of the resistance heating element can be molybdenum disilicide, platinum, platinum-rhodium, iron-chromium-aluminum alloys such as Kanthal Al, Kanthal APM (a ferritic iron-chromium-aluminum alloy), or another appropriate winding material.

In some embodiments, the heating element 124 may be constructed from wire formed from one of the above referenced materials which is wound into a coil. For example and without limitation, in one embodiment, the heating element 124 may be constructed from platinum wire having a circular cross section which is wound around a mandrel having a circular cross section in order to form a coil with a circular cross section. However, it should be understood that other cross sectional shapes of the coil are possible and contemplated. For example, in one embodiment, wire of the heating element may be wound around a mandrel having an elongated cross section, such as an oval, ellipse, or the like, in order to produce a coil having the same elongated cross section as the mandrel. It has been determined that forming the heating element 124 from a coil with an elongated cross section may improve the heating efficiency of the coil by increasing the power-carrying capacity of the coil. For example, it has been determined that platinum wire having a circular cross section which is wound into an oval coil with a ⅜" (9.53 mm) internal major diameter and a 3/16" (4.78 mm) internal minor diameter has a 25% increase in power carrying capacity compared to a round coil having a ⅜" (9.53 mm) diameter formed from the same platinum wire. The increased power carrying capacity translates to improved heating efficiency and efficacy for the coil.

Still referring to FIGS. 3-5, located behind the face of the heat directing surface 122 and within the enclosure 120 are one or more blocks of refractory material 128 which insulate the heat directing surface 122 from the balance of the replaceable heating cartridge 110a. In certain embodiments. The refractory blocks 128 are oriented in alternating vertical stacks and horizontal stacks, as depicted in FIG. 4B, to minimize heat transfer from the heat directing surface 122. Specifically, it is believed that alternating vertical stacks and horizontal stacks of refractory blocks 128 may assist in reducing heat at seams between the blocks. In embodiments, the refractory material 128 can be oriented at an angle approximately equal to the angle of the heat directing surface 122. In still other embodiments, such as where the heat directing surface 122 is formed from a refractory material such as SALI board or the like, the refractory material of the heat directing surface 122 may extend into the enclosure. In the embodiments described herein, the refractory blocks 128 may be formed from commercially available refractory materials including, without limitation, DuraBoard® 3000 and/or DuraBoard® 2600.

In certain embodiments, as shown in FIGS. 4 and 5, the heat directing surface 122 comprises a plurality of facets 161 orientated to at least partially surround the edge director(s). For example, in the embodiment of the replaceable heating cartridge 110a schematically depicted in FIGS. 4 and 5, the heat directing surface 122 has a center facet 162 and two side facets 164 on opposite ends of the center facet 162. Typically, the largest angle β between each of the two side facets 164 relative to the center facet 162 is from about 145° to about 175°. For example, the largest angle β between each of the two side facets 164 relative to the center facet 162 may about 160°, although it should be understood that other angles are possible and contemplated.

Figure 6:
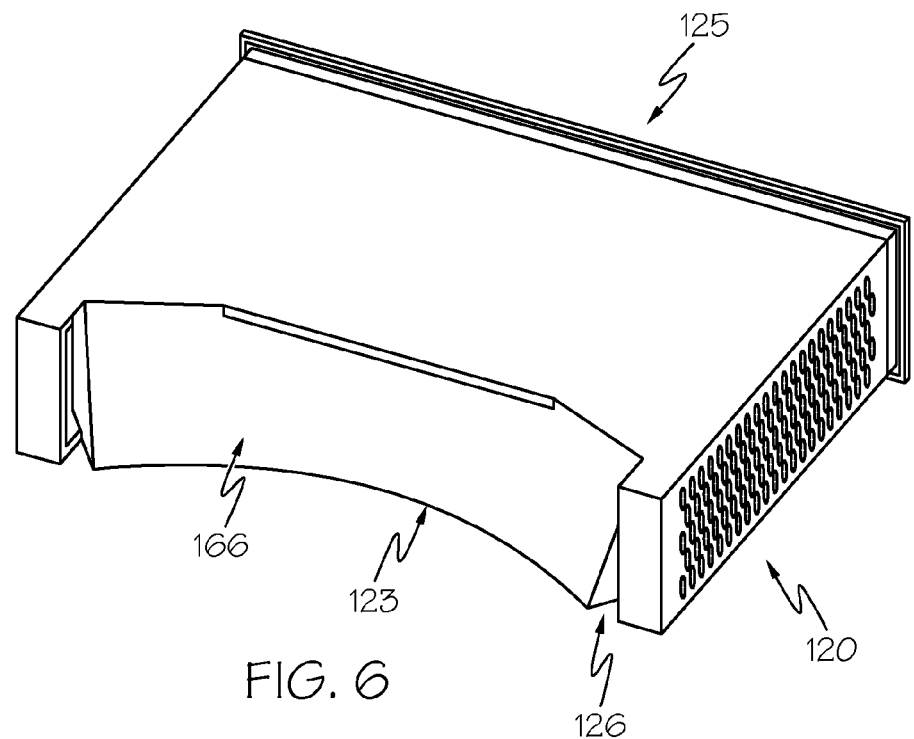
FIG. 6 schematically depicts a replaceable heating cartridge for use in an apparatus for making glass according to one or more embodiments shown and described herein. The heating element is not shown in this design.

While the embodiment of the replaceable heating cartridge 110a depicted in FIGS. 4A, 4B and 5 comprises a heat directing surface 122 with multiple facets, it should be understood that other embodiments are contemplated. For example, the heat directing surface 122 may comprise a curved surface. In the embodiment of the replaceable heating cartridge 110a depicted in FIG. 6, for example, the heat directing surface 122 comprises a frusto-conical 166 design. The faceted 161 or frusto-conical 166 design of the heat directing surface 122 increases the amount of heat directed toward the first edge director 80a, thereby minimizing heat loss to the surrounding environment and generally improving the heating efficiency of the replaceable heating cartridge with respect to the edge director. In addition, the frusto-conical and/or faceted designs of the heat directing surface 122 also improve the view factor between the heat directing surface 122 and the first edge director 80a.

Referring again to FIGS. 1 and 3, in the embodiments described herein, the replaceable heating cartridges 110a, 110b are positioned in the housing 14 of the glass forming apparatus 10 such that the lower edge 123 of the heat directing surface 122 and the bottom surface 126 of the enclosure 120 are at least partially positioned between the edge directors 80a, 80b and the plurality of edge rollers 132 to thermally shield the edge directors 80a, 80b from the plurality of edge rollers 132. As shown in FIG. 1, a first replaceable heating cartridge 110a is associated with the first edge director 80a. Likewise, a second replaceable heating cartridge 110b is associated with the second edge director 80b. In the embodiments described herein, it should be understood that the replaceable heating cartridge can function as both a heater for heating the corresponding edge director as well as a thermal shield for thermally isolating the edge director and the plurality of edge rollers from one another. This dual-functionality is enabled by the angled heat directing surface 122 of the replaceable heating cartridge which permits the replaceable heating cartridge to be at least partially positioned between the edge director and the plurality of edge rollers without contacting or otherwise interfering with the operation of either component. As such, the replaceable heating cartridges are configured to reduce heat loss from the corresponding edge directors 80a, 80b to non-target areas, and in particular, heat loss to the cooled edge roller assemblies 130a, 130b. Such non-target areas can include nearby areas of the glass making apparatus and/or other locations capable of drawing or sinking heat from the edge directors 80a, 80b.

Referring now to FIG. 3, a variety of attachment structures may be used to mount the replaceable heating cartridge 110a with respect to the edge director 80a. For example, in the embodiment shown in FIG. 3, the replaceable heating cartridge 110a is mounted in a port of the housing seal plate 136 such that the replaceable heating cartridge 110a is positioned below the forming vessel 60 between the edge director 80a and the first pair of edge rollers 132, as described above. In this embodiment, the replaceable heating cartridge 110a may be mounted on a bracket 114 engaged with the housing 14 and/or the housing seal plate 136. Additionally or alternatively, the replaceable heating cartridge 110a can rest on T-wall support brackets 112 that are attached to the housing seal plate 136. In some embodiments, the replaceable heating cartridge may be adjustably mounted relative to the edge director by being mounted to the movable housing seal plate 136.

In certain embodiments, the first replaceable heating cartridge 110a can be positioned below a portion of the first edge director 80a, and extends generally in a length-wise direction relative to the length dimension of the forming wedge 62 and in close proximity to the shafts 134a, 134b. As shown in FIGS. 2 and 3, the first replaceable heating cartridge 110a may be positioned below only a portion of the first edge director 80a. Indeed, as shown in FIG. 3, the first replaceable heating cartridge 110a is positioned such that the lower edge 123 of the heat directing surface 122 and the bottom surface 126 terminates outside of the corresponding edge 13 of the glass ribbon 12. As such, the lower edge 123 of the heat directing surface 122 and the bottom surface 126 of the first replaceable heating cartridge 110a only extend under an outside portion 83 of the first edge director 80a without extending under an inner portion 85 of the first edge director. In certain embodiments the lower edge 123 of the heat directing surface 122 and the bottom surface 126 of the first replaceable heating cartridge 110a do not extend inward in a direction toward the flow of molten glass beyond the width-wise extent of the root. That is, the lower edge 123 of the heat directing surface 122 and the bottom surface 126 of the first replaceable heating cartridge 110a are not directly beneath the root. Referring to FIG. 3 and FIG. 4A, in other embodiments, the replaceable heating cartridge 110 is positioned below the edge director such that the lower edge 123 of the center facet 162 of the heat directing surface 122 does not extend beyond the position of the dam 81 of the forming wedge 62 (e.g., the intersection of the forming wedge 62 with the retaining block 84) at the level of the root 70. That is, the lower edge 123 of the center facet 162 does not extend under the edge director 80a past a vertical line drawn from the forming wedge 62 at the intersection of the root 70 of the forming wedge 62 with the dam 81 of the forming wedge 62. Positioning the replaceable heating cartridge 110a in this manner maximizes the heat directed onto the edge director while ensuring that the lower edge 123 of the center facet 162 of the heat directing surface 122 does not interfere with the glass ribbon 12 drawn from the forming wedge 62. Accordingly, it should be understood that the angled heat directing surface 122 of the replaceable heating cartridge 110a is oriented to effectively direct heat onto the inner portion 85 of the first edge director 80a, thereby increasing the temperature of the inner portion 85 of the first edge director 80a and mitigating the devitrification of molten glass with this portion of the edge director 80a. Providing the first replaceable heating cartridge 110a at a location underneath only a portion of the first edge director 80a in this manner, or in certain other embodiments not extending beneath the root, can provide sufficient reduction of heat loss to non-target areas while avoiding possible interference with the molten glass being drawn from the root 70 of the forming wedge 62.

In addition or alternatively, the first replaceable heating cartridge 110a can be positioned partially or entirely downstream from the first edge director. For instance, as shown in FIGS. 2 and 3, the first replaceable heating cartridge 110a is depicted as being positioned entirely downstream along downstream direction 68 from the first edge director 80a. Positioning the first replaceable heating cartridge 110a entirely downstream of the first edge director 80a helps minimize heat loss from the first edge director 80a to non-target areas located downstream from the first edge director 80a.

In alternative embodiments (not shown), the first replaceable heating cartridge 110a can be positioned partially downstream from the first edge director 80a. For example, the first replaceable heating cartridge 110a can be positioned downstream from an upper portion of the first edge director 80a while a lower portion of the first edge director 80a is positioned downstream from the first replaceable heating cartridge 110a. In additional embodiments, the first replaceable heating cartridge 110a may be positioned adjacent to a first side of the first edge director 80a with an upper portion of the first edge director 80a extending above the first replaceable heating cartridge 110a and a lower portion of the first edge director 80a extending below the first replaceable heating cartridge 110a. Positioning the first replaceable heating cartridge 110a only partially downstream from the first edge director 80a may provide sufficient reduction of heat loss to non-target areas while providing a compact design or otherwise accommodating different forming vessel designs.

As shown in FIGS. 2 and 3, in certain embodiments the first replaceable heating cartridge 110a may be positioned partially between the first pair of edge rollers 132 and the first edge director 80a. For example, as shown in FIG. 3, the lower edge 123 of the heat directing surface 122 and a bottom surface 126 of the first replaceable heat cartridge 110a only extend between the outside portion 83 of the first edge director 80a and the first shaft 134a and the second shaft 134b of the first pair of edge rollers 132. The lower edge 123 of the heat directing surface 122 and a bottom surface 126 of the first replaceable heat cartridge 110a terminates outside of the corresponding edge 13 of the glass ribbon 12. As such, the lower edge 123 of the heat directing surface 122 and a bottom surface 126 of the first replaceable heat cartridge 110a do not extend between the inner portion 85 of the first edge director 80a and the edge rollers 132a, 132b of the first pair of edge rollers 132. However, the angled heat directing surface 122 of the replaceable heating cartridge 110a is oriented to effectively direct heat onto the inner portion 85 of the first edge director 80a, thereby increasing the temperature of the inner portion 85 of the first edge director 80a and mitigating the devitrification of molten glass with this portion of the edge director 80a.

In certain embodiments, the glass forming apparatus 10 can also include one or more optional additional heaters associated with one or both of the edge directors 80a, 80b. If provided, the one or more heaters can be constructed with various configurations that are capable of heating an interface between the molten glass and the edge directors 80a, 80b. For example, refractory or metallic resistance heaters, induction heaters or other heating devices may be used. In certain embodiments, resistive heaters (e.g., platinum winding, molybdenum disilicide winding, etc.) may be used. These heaters can be positioned at various locations within the housing 14 with respect to the corresponding edge director. As shown in FIG. 3, in one embodiment a heating device 170a may be positioned adjacent to the first edge director 80a, above the replaceable heating cartridge 110a. In this embodiment, the heating device 170a is oriented to radiate heat laterally toward the first edge director 80a. In addition or alternatively, a second heating device 170b may be positioned inside the first edge director 80a and configured to internally heat the first edge director 80a. Additional heating devices may be used at different locations to further heat the edge director. In embodiments, these devices may be formed from coils having elongated cross sections in order to improve the heating efficacy of the coils with respect to the edge directors. In the illustrated embodiments, the additional heating devices 170a, 170b are positioned upstream from the replaceable heating cartridge 110a. However, it should be understood that, in other embodiments the heaters may be located in other positions, including downstream of the replaceable heating cartridge 110a.

As further illustrated in FIG. 3, in certain embodiments the apparatus may further include a controller 180 configured to control heating associated with the first replaceable heat cartridge 110a. In certain embodiments the controller 180 may be operably connected to the first replaceable heating cartridges 110a and also to one or more optional heaters (e.g., heating devices 170a, 170b) associated with the edge director 80a. The controller 180 may include a processor and memory storing computer readable and executable instructions which, when executed by the processor, regulates the power to the replaceable heating cartridge and/or the heating devices, thereby increasing or decreasing the heat provided by the replaceable heating cartridge and/or the heating devices based on feedback or other process parameters.

In certain embodiments, the controller can be configured to operate the first replaceable heating cartridge 110a and the one or more optional heating devices 170a, 170b based on thermal feedback from the glass forming apparatus. For example, in one embodiment the controller 180 is configured to obtain thermal feedback from a thermal sensor 182. The feedback obtained by the thermal sensor 182 can be used by the controller 180 to adjust the replaceable heating cartridge and/or the heating devices in order to provide managed control of a thermal characteristic of the apparatus as the manufacture of glass ribbon proceeds. The thermal characteristic can include, for example, the temperature and/or heat loss associated with: a portion of the glass forming apparatus, such as the heat directing surface 122 of the replaceable heating cartridges 110a, 110b; a portion of the edge directors 80a, 80b; a portion of the end of the forming vessel 60; portions of the molten glass; and/or other features of the glass forming apparatus 10.

In one embodiment, the thermal sensor 182 may detect a temperature above a target level and the controller 180 may reduce power to the first replaceable heating cartridge 110a such that less heat is transferred to the target area, thereby reducing the temperature until the target level temperature is obtained. Alternatively, in certain embodiments the thermal sensor 182 may detect a temperature below a target level, wherein the controller 180 may increase power to the replaceable heating cartridge, such that more heat is transferred to the target area, thereby increasing the temperature until the target level temperature is obtained.

Various methods of making glass can incorporate various features of the glass forming apparatus 10 described above. In one embodiment, batch material can be converted to molten glass received by the forming vessel 60 by way of the exemplary series of glass melt stations described above. As shown in FIG. 2, the method includes the step of flowing molten glass 17 over the pair of downwardly inclined forming surface portions 66a, 66b of the forming wedge 62. As shown in FIGS. 2 and 3, the method further includes the steps of flowing molten glass over the edge director and drawing the molten glass from the root 70 of the forming wedge 62 to form the glass ribbon 12. The method also includes the step of providing a pair of edge rollers that are configured to engage the edge of the glass ribbon. The edge rollers are rotated by the motor 138 to draw the glass ribbon 12 from the root 70 of the forming wedge 62. As further illustrated, the method also includes the step of heating the edge directors with replaceable heating cartridges 110a, 110b to reduce heat loss from the corresponding edge directors 80a, 80b to non-target areas, and in particular, heat loss to the cooled edge rollers, as described above. It will be appreciated that aspects of the disclosure may positively impact glass edge quality and prevent degradation of edge conditions due to devitrification and crystal growth that may otherwise occur on the edge director surfaces.

EXAMPLES

The embodiments described herein will be further clarified by the following examples.

Example 1

A computational model was developed to compare the surface temperature of an edge director heated with a heater having a conventional design to the surface temperature of an edge director heated with a replaceable heating cartridge as described herein. The conventional heater was modeled with a heat directing surface with an inclined angle α of 90° relative to the base of the heater. The conventional heater was modeled with platinum alloy heating elements disposed on the heat directing face. The replaceable heating cartridge was modeled with a heat directing surface having an inclined angle α of 60° relative to the base of the replaceable heating cartridge. The replaceable heating cartridge was modeled with molybdenum disilicide heating elements positioned on the heat directing face. Both the conventional heater and the replaceable heating cartridge were modeled at an operating power of 6900 W.

Figure 7:
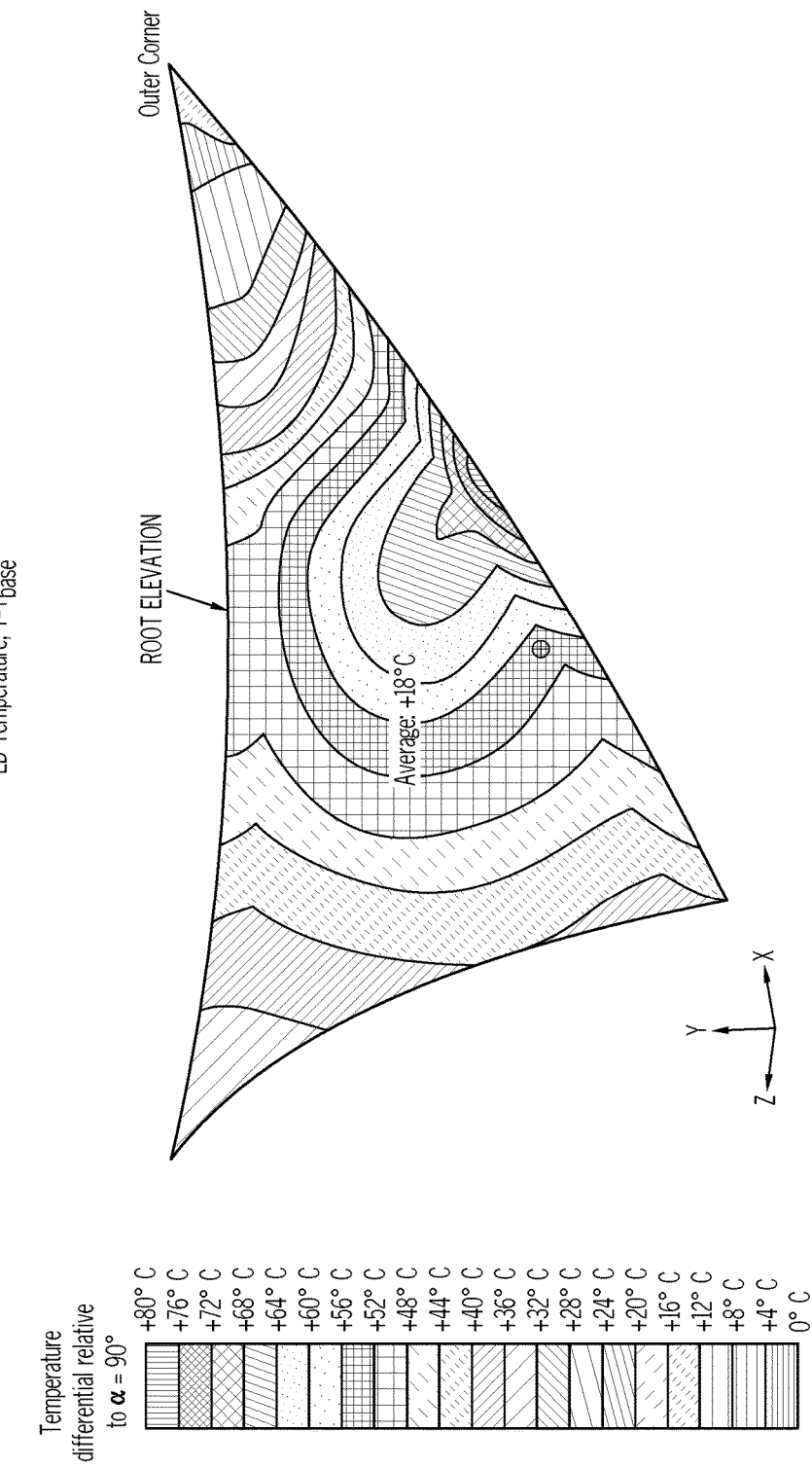
FIG. 7 schematically depicts the increased edge director temperature with the use of the replaceable heating cartridge with an inclined angle α of the heat directing surface of about 60° relative to the bottom surface compared to a heating cartridge with an inclined angle α of the heat directing surface of 90° relative to the bottom surface.

FIG. 7 graphically depicts the normalized temperature differential on the surface of the edge director due to heating with the replaceable heating cartridge having an inclined angle α of 60° relative to the conventional heater with an inclined angle α of 90°. That is, the isotherms of FIG. 7 show the increase in the surface temperature of the edge director as a result of heating with a heating cartridge having an inclined angle α of 60° relative to heating with a conventional heater with an inclined angle α of 90°. As depicted in FIG. 7, the replaceable heating cartridge with an inclined angle α of 60° increased the average temperature of the edge director by about 18° C. (averaged over the entire surface of the edge director) relative to the conventional design with an inclined angle α of 90°. Regardless of the heater used, the lowest temperature of the edge director generally occurs at the outer corner of the edge director at the root elevation, both of which are labeled in FIG. 7. However, the modeled date demonstrates that the replaceable heating cartridge with an inclined angle α of 60° increased the temperature of this outer corner by about 19° C. relative to the conventional design with an inclined angle α of 90°.

The data of FIG. 7 indicates that the replaceable heating cartridges described herein which have heat directing surfaces having an inclined angle α of less than 90°, such as from about 45° to about 75°, are more effective at maintaining the surface of the edge director at an elevated temperature relative to conventional heaters (i.e., heaters with an inclined angle α of) 90° and, as such, are more effective at reducing the devitrification of glass drawn over the edge director. In particular, the inclined angle of the heat directing surface allows heat to be more efficiently radiated towards the edge director. In addition, the inclined angle of the heating surface allows for the removable heating cartridge to be inserted between the pulling rolls and the edge director thereby thermally shielding the edge director from the pulling rolls which act as a heat sink.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of making a glass ribbon comprising:
flowing molten glass over a pair of downwardly inclined forming surface portions of a forming wedge, the pair of downwardly inclined forming surface portions converging along a downstream direction to form a root;
flowing the molten glass over an edge director intersecting with at least one of the pair of downwardly inclined forming surface portions;
drawing the molten glass from the root of the forming wedge to form the glass ribbon;
engaging an edge portion of the glass ribbon with a plurality of edge rollers positioned downstream from the root and the edge director, the plurality of edge rollers extending through a housing;
heating the edge director with a replaceable heating cartridge located in a port in the housing, wherein the replaceable heating cartridge is positioned between the plurality of edge rollers and the edge director, the replaceable heating cartridge comprising an enclosure having a heat directing surface that is inclined at an angle of less than about 90° with respect to a bottom surface of the enclosure, the heat directing surface comprising at least one heating element positioned on or adjacent to a face thereof, wherein the replaceable heating cartridge is oriented such that the heat directing surface faces the edge director, a view factor from the heat directing surface is greater at the edge director than at the plurality of edge rollers, and a lower edge of the heat directing surface and the bottom surface of the replaceable heating cartridge are at least partially positioned between the edge director and the plurality of edge rollers to thermally shield the edge director from the plurality of edge rollers; and detecting a temperature of a predetermined target area and adjusting the replaceable heating cartridge such that more or less heat is transferred from the replaceable heating cartridge to the predetermined target area, thereby varying the temperature of the predetermined target area until a target level temperature is obtained.

2. The method of claim 1, wherein the angle of the heat directing surface is from about 45° to about 75° relative to the bottom surface.

3. The method of claim 1, wherein the heat directing surface comprises a plurality of facets orientated to at least partially surround the edge director.

4. The method of claim 3, wherein the plurality of facets comprises a center facet and two side facets on opposite ends of the center facet, wherein a largest angle between each of the two side facets relative to the center facet is from about 145° to about 175°.

5. The method of claim 1, wherein the heat directing surface comprises a curved surface such that the heat directing surface at least partially surrounds the edge director.

6. The method of claim 1, wherein the replaceable heating cartridge is replaceable as the glass ribbon is being formed.

7. The method of claim 1, wherein the predetermined target area comprises at least one of the heat directing surface, the edge director, the forming wedge and the molten glass.

8. The method according to claim 1, wherein the adjusting comprises controlling electrical power to the replaceable heating cartridge with a controller operably connected to the replaceable heating cartridge and configured to receive thermal feedback from a thermal sensor.

* * * * *